(12) United States Patent
Yeh et al.

(10) Patent No.: US 8,499,320 B2
(45) Date of Patent: Jul. 30, 2013

(54) NEXT GENERATION USER INTERFACE FOR AUDIO VIDEO DISPLAY DEVICE SUCH AS TV WITH MULTIPLE USER INPUT MODES AND HIERARCHY THEREOF

(75) Inventors: Sabrina Tai-Chen Yeh, Laguna Beach, CA (US); Steven Friedlander, San Diego, CA (US); David Young, San Diego, CA (US)

(73) Assignee: Sony Corporation, Tokyo (JP)

( * ) Notice: Subject to any disclaimer, the term of this patent is extended or adjusted under 35 U.S.C. 154(b) by 98 days.

(21) Appl. No.: 13/163,997

(22) Filed: Jun. 20, 2011

(65) Prior Publication Data

US 2012/0257121 A1 Oct. 11, 2012

Related U.S. Application Data

(60) Provisional application No. 61/473,098, filed on Apr. 7, 2011.

(51) Int. Cl.
*H04N 5/44* (2011.01)

(52) U.S. Cl.
USPC .............................................. 725/37; 348/734

(58) Field of Classification Search
None
See application file for complete search history.

*Primary Examiner* — Vivek Srivastava
*Assistant Examiner* — Rong Le
(74) *Attorney, Agent, or Firm* — John L. Rogitz

(57) ABSTRACT

A television user interface allows viewer commands to be input using a remote control, voice input, and hand movements in free space, as well as facial recognition using a camera integrated into the television. All three input modes can be active simultaneously, and so a hierarchy of modes is established to resolve conflicting commands received more or less simultaneously in different modes.

17 Claims, 4 Drawing Sheets

Command Conflict Logic

System

Example RC

GUI (coarse)

GUI (fine)

Command Conflict Logic

Command Conflict Logic

NEXT GENERATION USER INTERFACE FOR AUDIO VIDEO DISPLAY DEVICE SUCH AS TV WITH MULTIPLE USER INPUT MODES AND HIERARCHY THEREOF

This application claims priority to U.S. provisional patent application Ser. No. 61/473,098, filed Apr. 7, 2011.

I. FIELD OF THE INVENTION

The present application relates generally to user interfaces (UI) for audio video display devices (AVDD) such as televisions (TVs).

II. BACKGROUND OF THE INVENTION

Current televisions are controlled mainly by a viewer manipulating a remote control (RC). As understood herein, remote controls can be temporarily misplaced and are not ideal for text entry, and furthermore allow only a single user to control the TV. As also understood herein, when additional command input modes such as voice recognition are desired to compensate for the above shortcoming of RCs, it is desirable that available voice commands not be available only in certain contexts but rather that voice command entry is more robust.

Furthermore, the present application recognizes that current technology lacks the ability to allow a user to manage complex in-home entertainment technology in a simple, intuitive, and effective way due to the increasing complexity of televisions and other home entertainment technology. Thus, a need has arisen to provide simplified user interfaces that are intuitive, convenient and accessible, while still being effective.

SUMMARY OF THE INVENTION

Present principles recognize that hand gestures and voice commands can be easier than finding a lost RC and/or locating the correct key on the RC to instigate the desired action, and that by providing multiple redundant ways to access items, a viewer can choose to use gesture, remote, or voice input depending on the specific need or comfort level. For instance, using voice input can be easier than using a keyboard or RC, whereas using a pointing device may be easier than using gesture or voice to activate a particular onscreen element (such as navigating an application or web page on a television screen). By allowing all the different types of input modes simultaneously, the user can flexibly choose the most appropriate mode.

According to principles set forth further below, viewer command entry to an audio video display device (AVDD) is enabled using an RC and also using voice commands as well as hand gestures in free space, making the user interface to the AVDD more accessible by allowing multiple ways to achieve the same functionality, so users who may not be able to easily use a remote control can also control the television using voice or gestures.

Accordingly, an AVDD may include a processor and a video display that may present demanded images under control of the processor. In non-limiting embodiments, the AVDD may also include a computer readable storage medium bearing instructions executable by the processor to control the display responsive to user commands received from a remote control (RC), and from a human voice, and from a human hand gesture. If desired, voice command input, gesture command input, and RC command input may be enabled simultaneously for input to the processor.

In non-limiting embodiments, multiple conflicting commands may be received by the AVDD. Therefore, there may arise a need determine which command to execute. Thus, responsive to a determination that a RC command conflicts with a voice command, the processor may execute the RC command and may not execute the voice command in some embodiments. Also in some embodiments, responsive to a determination that a RC command conflicts with a gesture command, the processor may execute the RC command and may not execute the gesture command. Even further, responsive to a determination that a gesture command conflicts with a voice command, the processor may execute the voice command and may not execute the gesture command in some embodiments.

Additionally, in non-limiting embodiments, multiple commands may be received from different viewers of the AVDD. Therefore, a need may arise to determine which command to execute. Thus, responsive to a determination that a first command from a first recognized viewer conflicts with a second command from a second recognized viewer, the processor may execute the latest of the first and second commands in some embodiments. Further, if desired, responsive to a determination that a command from a recognized viewer conflicts with a command from a non-recognized viewer, the processor may execute the command from the recognized viewer.

More specifically, responsive to a determination that a voice command from a recognized viewer conflicts with a voice command from a non-recognized viewer, the processor may execute the voice command from the recognized viewer in some embodiments. Also in some embodiments, responsive to a determination that a gesture command from a recognized viewer conflicts with a gesture command from a non-recognized viewer, the processor may execute the gesture command from the recognized viewer.

Additionally, responsive to a determination that a first voice command from a first recognized viewer conflicts with a second voice command from a second recognized viewer, the processor may execute the latest of the first and second voice commands in non-limiting embodiments. Also in non-limiting embodiments, responsive to a determination that a first gesture command from a first recognized viewer conflicts with a second gesture command from a second recognized viewer, the processor may execute the latest of the first and second gesture commands in some embodiments.

In another aspect, a television (TV) may present a user interface allowing viewer commands to be input using a remote control (RC), voice input, and gestures in free space. All three input modes may be enabled simultaneously in non-limiting embodiments. Further, a hierarchy of modes may be established to resolve conflicting commands. It is to be understood that, in non-limiting embodiments, commands may be received within a predetermined period for the commands to be conflicting.

In yet another aspect, a method may include presenting a user interface on an audio video display device (AVDD) having a display. The method may include allowing viewer commands to be input using a remote, control (RC), voice input, and gesture(s) in free space, wherein all three input modes may be enabled simultaneously in non-limiting embodiments. If desired, the method may also include controlling the display responsive to user commands received from the RC, voice input, and gesture(s) in fee space.

The details of the present invention, both as to its structure and operation, can best be understood in reference to the

DETAILED DESCRIPTION OF THE PREFERRED EMBODIMENT

Figure 1:
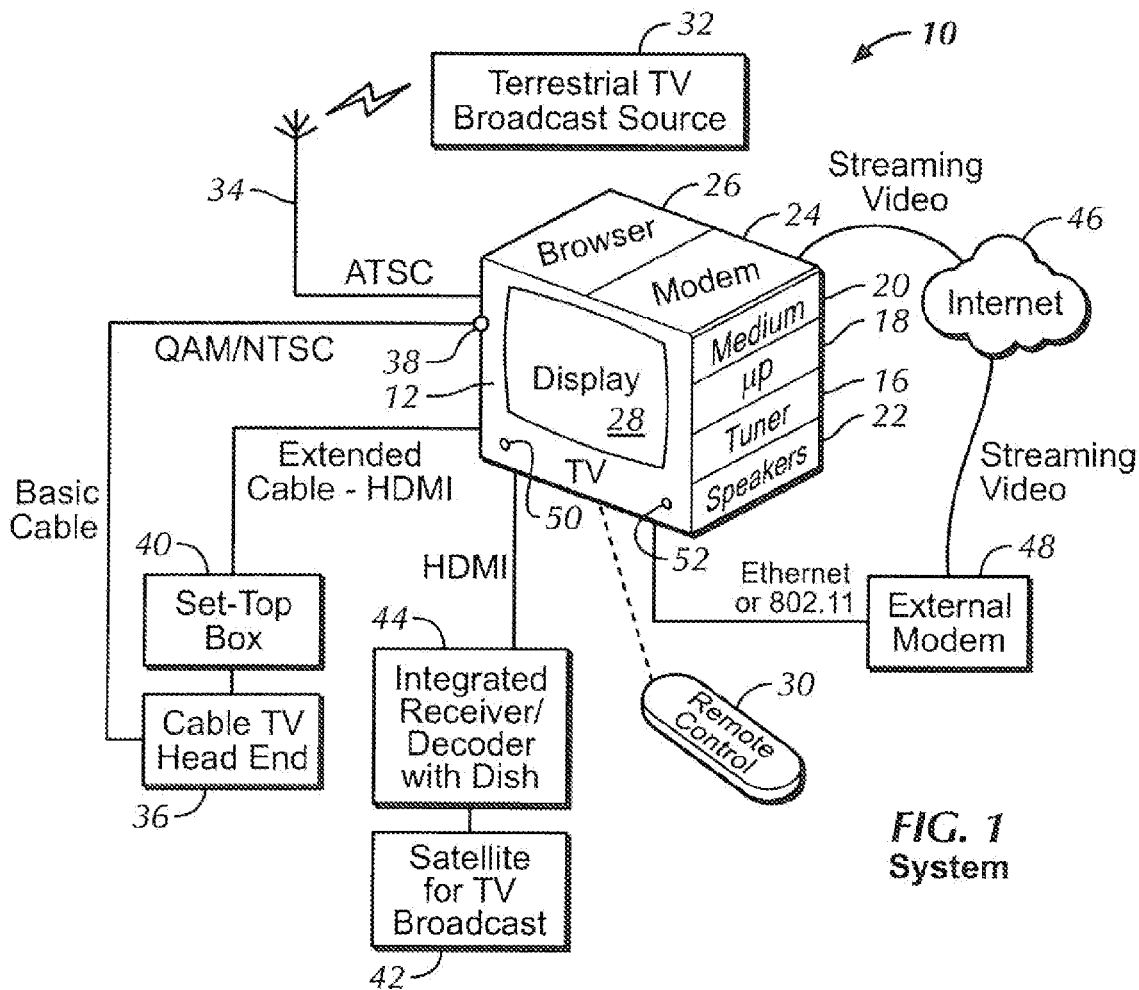
FIG. 1 is a block diagram of a non-limiting example system in accordance with present principles.

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more speakers 22. The AVDD 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display, and may be a touch screen display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the AVDD 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USB, 1394 protocols, DLNA.

Similarly, HDMI baseband signals transmitted from a satellite source 42 of TV broadcast signals received by an integrated receiver/decoder (IRD) 44 associated with a home satellite dish may be input to the AVDD 12 for presentation on the display 28 and speakers 22. Also, streaming video may be received from the Internet 46 for presentation on the display 28 and speakers 22. The streaming video may be received at the computer modern 24 or it may be received at an in-home modem 48 that is external to the AVDD 12 and conveyed to the AVDD 12 over a wired or wireless Ethernet link and received at an RJ45 or 802.11x antenna on the TV chassis.

Also, in some embodiments a video camera 50, which may be integrated in the chassis if desired or mounted separately and electrically connected thereto, may be connected to the processor 16 to provide to the processor 16 video images of viewers looking at the display 28. In some non-limiting embodiments, the processor 16 executes facial recognition using the video images received from the camera 50 to identify particular viewers. The processor 16 also stores images of viewers on the medium 20 in non-limiting embodiments for future determination of whether a viewer is recognized when compared to stored images, or whether a recently received image relates to a new, or non-recognized, viewer. If desired, the processor 16 also creates and/or associates a profile with a user and/or stored images of the user and store the profile on the medium 20. A microphone 52 may also be provided on the chassis or separate therefrom and can be electrically connected to the processor 16 to provide viewer-generated voice commands to the processor 16.

Figure 2:
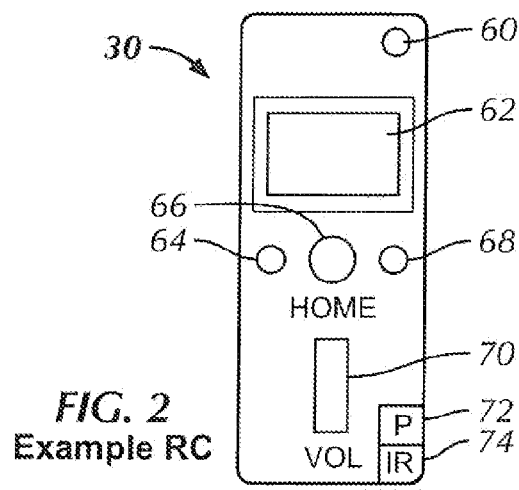
FIG. 2 is a plan view of an example remote control (RC) that may be used to control the graphical user interfaces (GUI) described herein, schematically showing the processor and wireless transceiver.

FIG. 2 shows that an example RC 30 may include a power on key 60 that can be toggled to energize and deenergize the AVDD 12. A touch-sensitive pad 62 may be provided against which a user can move his finger to correspondingly move a screen cursor on the display 28. Tapping the pad 62 can generate a "select" signal, it being understood that point-and-click devices other than the touch sensitive pad 62 may be used.

Also, a back key 64 may be provided to cause the display 28 to go back a screen shot, i.e., to present the screen shot immediately prior to the one being displayed when the back signal is generated, so as to enable a user to navigate through the various GUIs shown herein. A home key 66 may be provided to cause the below-described "home" GUI to be presented on the display 28, and an options key 68 may be provided to allow a user to cause a list of GUT options to be presented in the display 28. Volume output by the speakers 22 of the AVDD 12 can be controlled using a volume up/down rocker key 70. Manipulation of a key or the pad 62 on the RC 30 causes a respective signal to be sent to an RC processor 72 in the RC 30, which transmits the corresponding command to the AVDD 12 using a wireless transceiver 74 such as but not limited to an infrared transceiver. In addition, if desired four arrow keys may be arranged on the RC 30 to move a cursor up, down, left, and right on the display 28. Also, channel up/down keys may be provided as well as a microphone for voice input. A full QWERTY keyboard or keypad may be provided if desired. The touch pad 62 may be provided with a buzzer or other device to generate tactile feedback to the user.

Figures 3, 4:
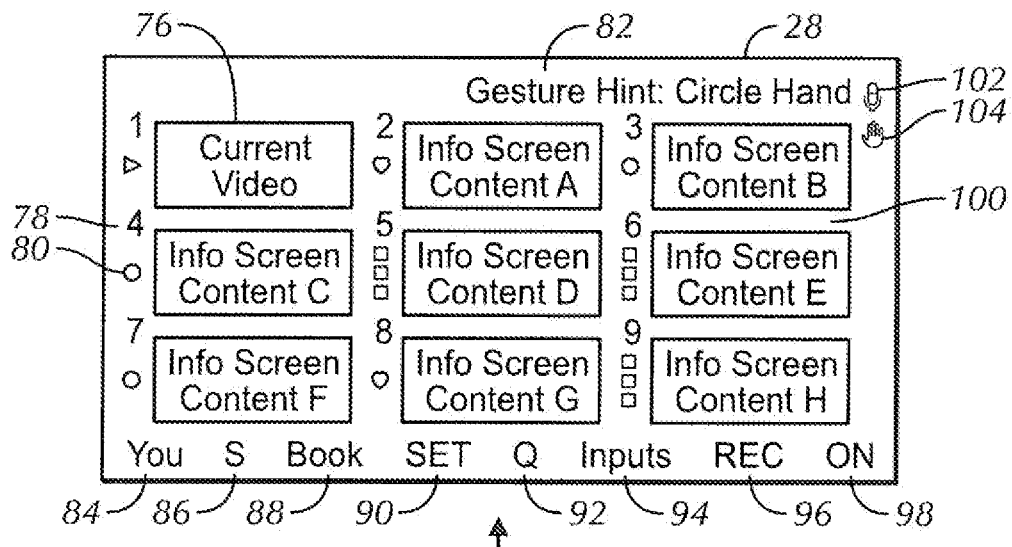
FIG. 3 is a screen shot of a nine panel GUI in a coarse mode suitable for gesture control.
FIG. 4 is a screen shot of a nine panel GUI in a fine mode suitable for RC control.

FIGS. 3 and 4 show an example home GUI that may be presented on the display 28 of the AVDD 12. In the embodiment shown in FIG. 3, nine information panels arranged as shown in three rows of three panels each present visual content. According to the embodiment shown in FIG. 3, the top left panel 76 of the GUI always shows the currently selected video content, typically either televised content from a selected TV channel or streaming video from a selected website. Information pertaining to available video content is presented in the other eight panels. This information typically includes a photograph or other image, a content source logo indicating the source of the content represented by the panel, and text typically describing the title of the content and other information.

As shown at 78, a numeral may be provided next to each panel, so that the panels may be numbered onscreen from one to nine as shown. This facilitates a user selecting to play video content from a panel by saying the numeral associated with the panel. Also, as shown at 80 a genre indicator may be presented next to each panel. The genre indicator may be an arrow in the case of the first panel 76 indicating that the first panel 76 is presenting the currently selected video. The genre indicator may be a heart (as shown in FIG. 3 for panel 2) indicating the underlying video content has been selected by the user as a "favorite". Other genre indicators may be presented respectively representing "history", meaning that the content associated with the panel had been presented previously, "recommended", meaning that the content associated with the panel is recommended by a recommendation engine executed by the AVDD processor 18, and so on, e.g., "frequently viewed", "promotional content". A user can select to present panels associated with content of only a single genre.

Additionally, if desired the GUI shown in FIG. 3 may present gesture hints 82, describing in text and/or animated hand motion a gesture and its associated command that the user may make, which can be captured by the camera 50 and correlated to the respective command by the processor 18 executing image recognition software. Thus, while viewer input may be afforded by making the display 28 a touch-sensitive display that a viewer can touch and thereby enter commands, present principles envision using viewer gestures in free space, i.e., gestures in which the viewer is distanced from the display 28 as would typically be the case for a TV viewer, with the viewer not touching the display but making gestures that are captured by the camera 50 and correlated to commands by the processor 18 executing image recognition software.

Further, a menu of selections may be presented as shown along the bottom of the GUI, including a "just for you" selector 84 to cause the GUI to contain panels with content personalized to a recognized user. A search selector 86 can be selected to cause a search for a user-input term to be executed. Also, a bookmark selector 88 can be selected to bookmark the currently playing video in panel 76 or to bookmark content in a panel over which the screen cursor is positioned.

Still referring to FIG. 3, a settings selector element 90 if selected causes a setting menus to be presented to control settings of the GUI. A queue selector element 92 may be presented to cause a list of enqueued programs to be presented on the display 28, and an inputs selector element 94 may be presented, selection of which causes a list of available input sources, e.g., "disk player, cable, satellite" to be presented on the display 28. A recommendations selector element 96 may be presented and if selected causes a list of recommended programming to be presented on the display 28. The list may be generated by a content recommendation engine such as the "Navi" engine made by Sony Corp. A "what's on" selector element 98 may be provided and if selected causes a list of current and future programs such as an electronic program guide (EPG) to be presented on the display 28. Indeed, an EPG may be presented in one of the panels shown in FIG. 3.

In any case, as mentioned above in the example shown the currently selected video content is always presented in the upper left panel 76 of the GUI. Should the user select another panel by using the RC 30 or by speaking the number of the panel or by the appropriate gesture captured by the camera 50, video content from the source associated with the selected panel automatically replaces the video content which was presented in the upper left panel 76 prior to receiving the new select signal. Indeed, should the user scroll the panels left or right to view additional content the upper left panel 76 remains unmoving as the other panels move on and off the display 28 as they are replaced by previously hidden content panels, with the upper left panel 76 always showing the currently selected video program.

The panel layout shown in FIG. 3 is somewhat coarse in that a visible border space 100 of many pixels width exists between adjacent panels as shown. Such a coarse representation facilitates control using gestures, although navigation by voice and by use of the RC 30 is always preferably enabled regardless of whether the GUI is in the coarse or fine view. FIG. 4 shows that if the user selects the fine view, the border space 100 disappears between adjacent panels, a view more suitable for RC control than gesture control although as stated above all three modes of command input (RC, voice, and gesture) remain enabled simultaneously with each other if desired.

Transition between the two views of FIGS. 3 and 4 may be effected by an appropriate hand gesture (e.g., a vertical motion of the hand) or by an appropriate voice command (e.g., "fine" or "coarse"), or by selecting, using the RC 30, "fine" or "course" from a settings menu accessed by selecting the settings selector element 90 or by pressing a key on the RC 30 or by simply grasping the RC, which is detected by the camera 50 and inferred by the processor 18 to correlate to a command to move to the "fine" screen of FIG. 4. The larger panels in the fine mode of FIG. 4 can be used to present more information than is presented in the panels of FIG. 3.

The GUI shown in FIGS. 3 and 4 may be removed from the screen and the currently playing video presented on the full display 28 by, e.g., toggling the home key on the RC 30. Voice command input may be enabled by voicing a phrase such as "hello TV", which is detected by the microphone 52 and using voice recognition software correlated by the processor 18 to a command to enable voice commands. Voice input may also be enabled using the RC 30 to select the "search" selector element 86. To indicate that voice commands are enabled, an icon such as an image of a microphone 102 can be presented on the display 28. Gesture command input may be enabled by waving the hand, which is detected by the camera 50 and using image recognition software correlated by the processor 18 to a command to enable gesture commands. To indicate that gesture commands are enabled, an icon such as an image of a hand 104 can be presented on the display 28. When voice or gesture commands are not enabled, the icons 102, 104, respectively, are removed from the display 28.

Non-limiting examples of corresponding RC, voice, and gesture commands that accomplish the same tasks are:

| RC COMMAND | VOICE COMMAND | GESTURE |
| --- | --- | --- |
| Channel up | "Channel up" | upward motion of hand |
| Channel down | "Channel down" | downward motion of hand |
| Volume decrease | "Quieter" | thumb down |
| Volume increase | "louder" | thumb up |

Figure 5:
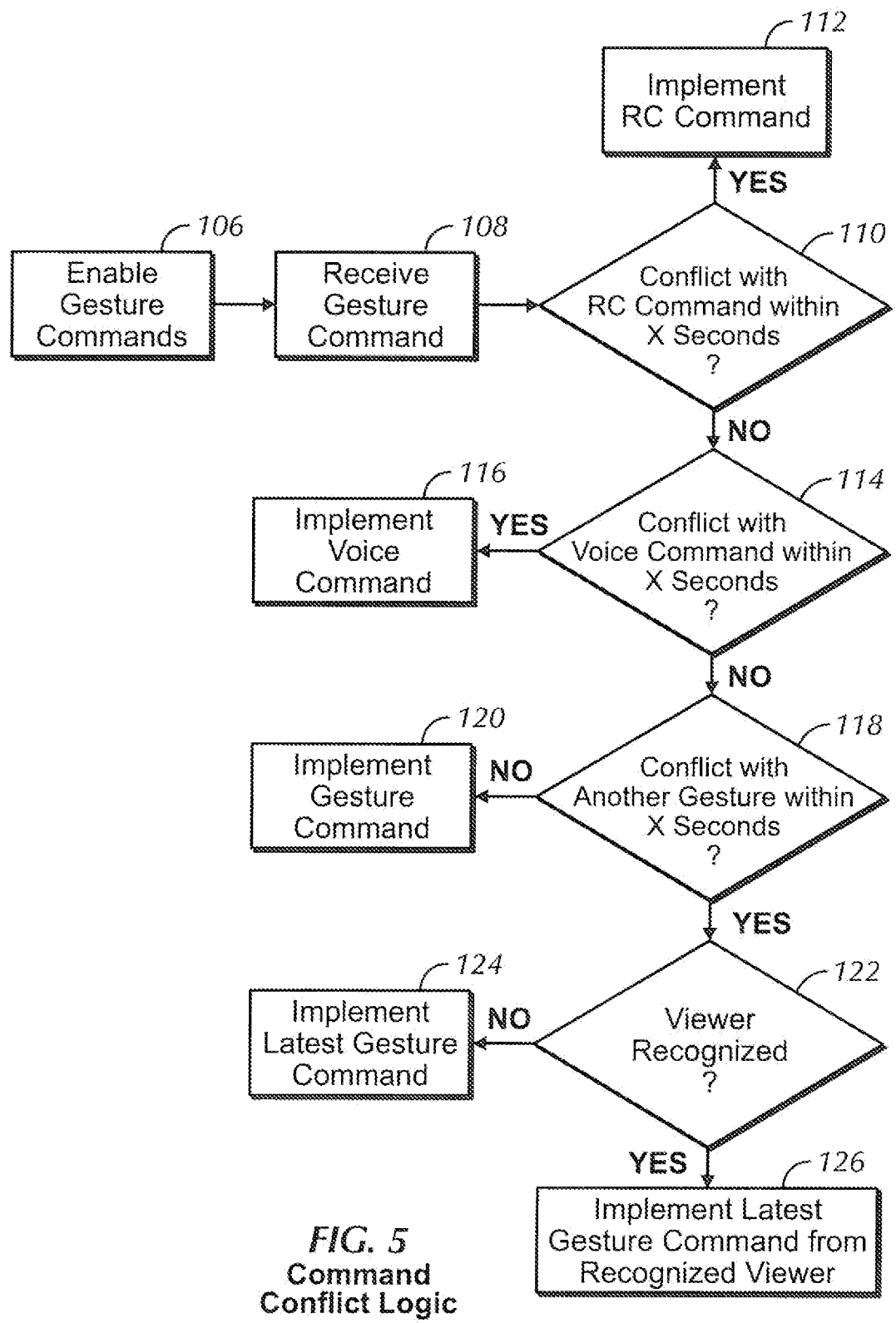
FIGS. 5 and 6 are flow charts showing example command conflict resolution logic.

Now in reference to FIG. 5, a non-limiting flow chart showing example command conflict resolution logic is shown. It is to be understood that, in some instances, the AVDD 12 referenced above may receive multiple commands within a given time frame from different methods of input. For example, conflicting commands may be received from the RC 30 and from voice input within "X" seconds of each other. Therefore, present principles recognize that conflicting commands must be resolved.

Thus, beginning at block 106, the logic enables gesture commands to be detected and/or received by the AVDD 12.

Then at block 108 the logic receives a gesture command. Moving to decision diamond 110, the logic then determines whether a conflict of commands exists between the gesture command received at block 108 and a RC command also received within X seconds (before or after) of the gesture command.

If the logic determines that there is a conflict of commands at diamond 110, the logic then moves to block 112 where the logic implements the RC command and not the gesture command. However, if the logic determines that there is no conflict of commands between the gesture command and a RC command at diamond 110, the logic instead moves to decision diamond 114. At diamond 114, the logic determines whether there is a conflict between the gesture command received at block 108 and a voice command also received within X seconds of the gesture command.

If the logic determines that there is a conflict of commands at diamond 114, the logic then moves to block 116 where the logic implements the voice command and not the gesture command. However, if the logic determines that there is no conflict of commands between the gesture command and the voice command at diamond 114, the logic instead moves to decision diamond 118. At diamond 118, the logic determines whether there is a conflict between the gesture command received at block 108 and another gesture command received within X seconds of the first gesture command.

If the logic determines that there is no conflict of gesture commands at diamond 118, the logic then moves to block 120 where the logic implements the non-conflicting gesture command. However, if the logic determines that there was a conflict of gesture commands at diamond 118, the logic instead moves to decision diamond 122. At diamond 122, the logic determines whether one or more users providing the gesture commands are recognized in accordance with present principles.

If the logic determines that one or more users are not recognized at diamond 122, the logic then moves to block 124 where the logic implements the latest gesture command received by the AVDD 12. However, if the logic determines that at least one user is recognized at diamond 122, the logic instead moves to block 126. At block 126, the logic implements the latest gesture command from a recognized user. The logic may thus conclude at either block 124 or block 126, depending on the determination made at diamond 122.

Figure 6:
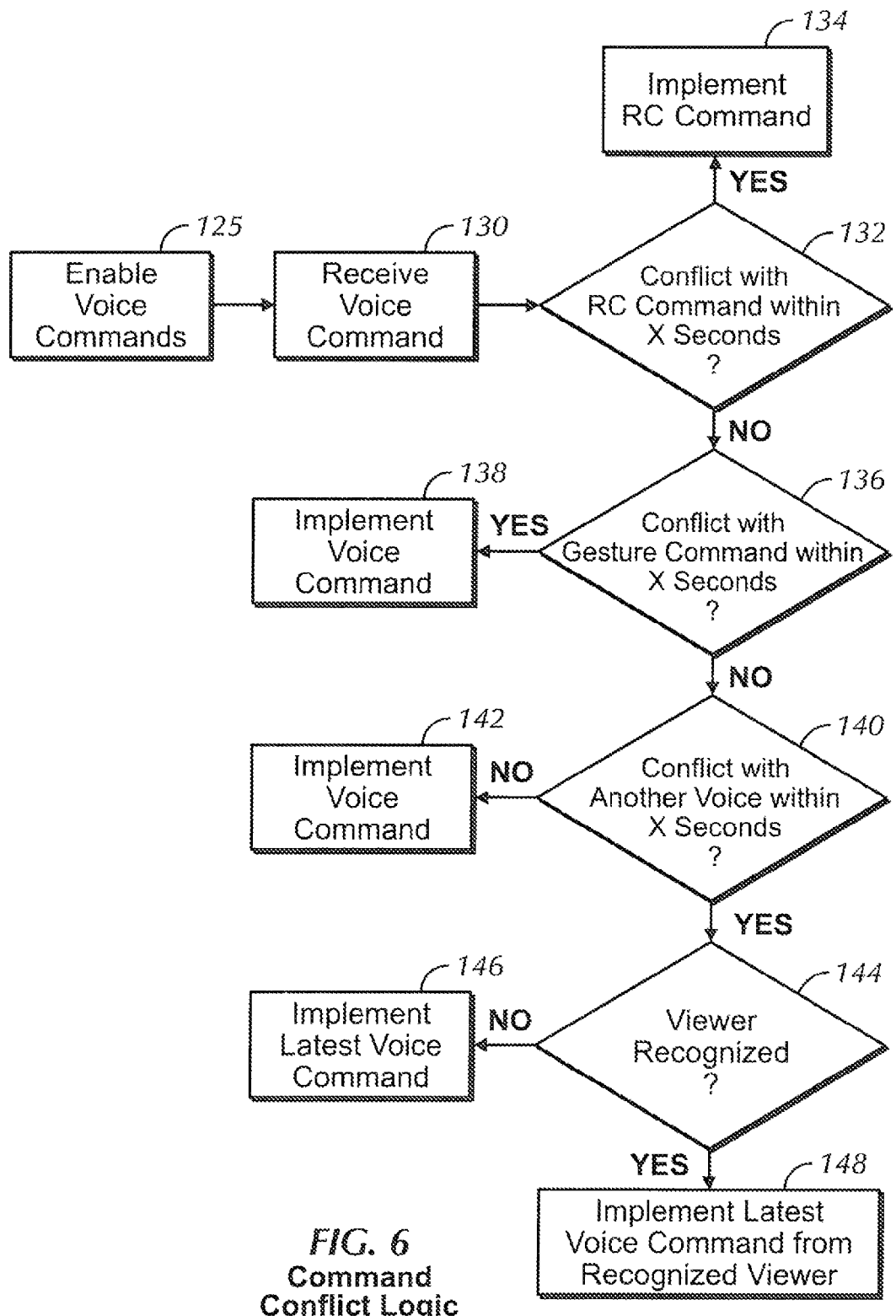

Now in reference to FIG. 6, another non-limiting flow chart showing example command conflict resolution logic is shown. Beginning at block 128, the logic enables voice commands to be detected and/or received by the AVDD 12. Then at block 130 the logic receives a voice command. Moving to decision diamond 132, the logic then determines whether a conflict of commands exists between the voice command received at block 130 and a RC command also received within X seconds of the voice command.

If the logic determines that there is a conflict of commands at diamond 132, the logic then moves to block 134 where the logic implements the RC command and not the voice command. However, if the logic determines that there is no conflict of commands between the voice command and a RC command at diamond 132, the logic instead moves to decision diamond 136. At diamond 136, the logic determines whether there is a conflict between the voice command received at block 130 and a gesture command also received within X seconds of the voice command.

If the logic determines that there is a conflict of commands at diamond 136, the logic then moves to block 138 where the logic implements the voice command and not the gesture command. However, if the logic determines that there is no conflict of commands between the gesture command and the voice command at diamond 136, the logic instead moves to decision diamond 140. At diamond 140, the logic determines whether there is a conflict between the voice command received at block 130 and another voice command received within X seconds of the first voice command.

If the logic determines that there is no conflict of voice commands at diamond 140, the logic then moves to block 142 where the logic implements the non-conflicting voice command. However, if the logic determines that there was a conflict of voice commands at diamond 140, the logic instead moves to decision diamond 144. At diamond 144, the logic determines whether one or more users providing the voice commands are recognized in accordance with present principles.

If the logic determines that one or more users are not recognized at diamond 144, the logic then moves to block 146 where the logic implements the latest voice command received by the AVDD 12. However, if the logic determines that at least one user is recognized at diamond 144, the logic instead moves to block 148. At block 148, the logic implements the latest voice command from a recognized user. The logic may thus conclude at either block 146 or block 148, depending on the determination made at diamond 144.

It may now be appreciated that in the example embodiment above, RC commands can take precedence over conflicting voice and gesture commands that are received within a predetermined period, e.g., a few seconds, of the RC command, and that a voice command takes precedence over a conflicting gesture command in non-limiting embodiments. Present principles thus recognize that the deliberate manipulation of an RC, with predetermined keys correlated to specific commands, typically indicates a deliberate user intention to input a command more dispositively than a voice or gesture command because voice commands may be spoken as part of normal speech, not intended to constitute a command, and gestures likewise might accompany speech without the intention that the gesture constitute a command. Additionally, in some cases commands from a recognized user, regardless what mode the commands are received by, can be given precedence over conflicting commands from a non-recognized user regardless of mode of input.

It is to be further appreciated that while FIGS. 5 and 6 give priority to one gesture command from a recognized user over a gesture command from a non-recognized user, in other embodiments priority may be given to any type of command (RC, voice, or gesture in free space) from a recognized user over any other command from a non-recognized user. Also, priority may be given to the latest of two commands when both are input from recognized users.

While the particular NEXT GENERATION USER INTERFACE FOR AUDIO VIDEO DISPLAY DEVICE SUCH AS TV WITH MULTIPLE USER INPUT MODES AND HIERARCHY THEREOF is herein shown and described in detail, it is to be understood that the subject matter which is encompassed by the present invention is limited only by the claims.

What is claimed is:

1. An audio video display device (AVDD) comprising:
   processor;
   video display presenting demanded images under control of the processor;
   computer readable storage medium bearing instructions executable by the processor to:
   control the display responsive to user commands received from a remote control (RC), and from a human voice, and from a human hand gesture, wherein voice command input, gesture command input, and RC command input can be enabled simultaneously for command input to the processor, wherein responsive to a determination that a RC command conflicts with a voice command, the processor executes the RC command and does not execute the voice command.

2. An audio video display device (AVDD) comprising:
processor;
video display presenting demanded images under control of the processor;
computer readable storage medium bearing instructions executable by the processor to:
control the display responsive to user commands received from a remote control (RC), and from a human voice, and from a human hand gesture, wherein voice command input, gesture command input, and RC command input can be enabled simultaneously for command input to the processor, wherein responsive to a determination that a RC command conflicts with a gesture command, the processor executes the RC command and does not execute the gesture command.

3. An audio video display device (AVDD) comprising:
processor;
video display presenting demanded images under control of the processor;
computer readable storage medium bearing instructions executable by the processor to:
control the display responsive to user commands received from a remote control (RC), and from a human voice, and from a human hand gesture, wherein voice command input, gesture command input, and RC command input can be enabled simultaneously for command input to the processor, wherein responsive to a determination that a gesture command conflicts with a voice command, the processor executes the voice command and does not execute the gesture command.

4. An audio video display device (AVDD) comprising:
processor;
video display presenting demanded images under control of the processor;
computer readable storage medium bearing instructions executable by the processor to:
control the display responsive to user commands received from a remote control (RC), and from a human voice, and from a human hand gesture, wherein voice command input, gesture command input, and RC command input can be enabled simultaneously for command input to the processor, wherein responsive to a determination that a voice command from a recognized viewer conflicts with a voice command from a non-recognized viewer, the processor executes the voice command from the recognized viewer.

5. An audio video display device (AVDD) comprising:
processor;
video display presenting demanded images under control of the processor;
computer readable storage medium bearing instructions executable by the processor to:
control the display responsive to user commands received from a remote control (RC), and from a human voice, and from a human hand gesture, wherein voice command input, gesture command input, and RC command input can be enabled simultaneously for command input to the processor, wherein responsive to a determination that a first voice command from a first recognized viewer conflicts with a second voice command from a second recognized viewer, the processor executes the latest of the first and second voice commands.

6. An audio video display device (AVDD) comprising:
processor;
video display presenting demanded images under control of the processor;
computer readable storage medium bearing instructions executable by the processor to:
control the display responsive to user commands received from a remote control (RC), and from a human voice, and from a human hand gesture, wherein voice command input, gesture command input, and RC command input can be enabled simultaneously for command input to the processor, wherein responsive to a determination that a gesture command from a recognized viewer conflicts with a gesture command from a non-recognized viewer, the processor executes the gesture command from the recognized viewer.

7. An audio video display device (AVDD) comprising:
processor;
video display presenting demanded images under control of the processor;
computer readable storage medium bearing instructions executable by the processor to:
control the display responsive to user commands received from a remote control (RC), and from a human voice, and from a human hand gesture, wherein voice command input, gesture command input, and RC command input can be enabled simultaneously for command input to the processor, wherein responsive to a determination that a first gesture command from a first recognized viewer conflicts with a second gesture command from a second recognized viewer, the processor executes the latest of the first and second gesture commands.

8. An audio video display device (AVDD) comprising:
processor;
video display presenting demanded images under control of the processor;
computer readable storage medium bearing instructions executable by the processor to:
control the display responsive to user commands received from a remote control (RC), and from a human voice, and from a human hand gesture, wherein voice command input, gesture command input, and RC command input can be enabled simultaneously for command input to the processor, wherein responsive to a determination that a first command from a first recognized viewer conflicts with a second command from a second recognized viewer, the processor executes the latest of the first and second commands.

9. An audio video display device (AVDD) comprising:
processor;
video display presenting demanded images under control of the processor;
computer readable storage medium bearing instructions executable by the processor to:
control the display responsive to user commands received from a remote control (RC), and from a human voice, and from a human hand gesture, wherein voice command input, gesture command input, and RC command input can be enabled simultaneously for command input to the processor, wherein responsive to a determination that a command from a recognized viewer conflicts with a command from a non-recognized viewer, the processor executes the command from the recognized viewer.

10. A television (TV) presenting a user interface allowing viewer commands to be input using a remote control (RC), voice input, and gestures in free space, all three input modes being enabled simultaneously, a hierarchy of modes being established to resolve conflicting commands received within a predetermined period in different modes, wherein responsive to a determination that a viewer command input using the RC conflicts with a voice input command, the TV executes the command input using the RC and does not execute the voice input command.

11. A television (TV) presenting a user interface allowing viewer commands to be input using a remote control (RC), voice input, and gestures in free space, all three input modes being enabled simultaneously, a hierarchy of modes being established to resolve conflicting commands received within a predetermined period in different modes, wherein responsive to a determination that a viewer command input using the RC conflicts with a viewer command input using a gesture in free space, the TV executes the command input using the RC and does not execute the command input using a gesture in free space.

12. A television (TV) presenting a user interface allowing viewer commands to be input using a remote control (RC), voice input, and gestures in free space, all three input modes being enabled simultaneously, a hierarchy of modes being established to resolve conflicting commands received within a predetermined period in different modes, wherein responsive to a determination that a viewer command input using a gesture in free space conflicts with a voice input command, the TV executes the voice input command and does not execute the viewer command input using a gesture in free space.

13. A television (TV) presenting a user interface allowing viewer commands to be input using a remote control (RC), voice input, and gestures in free space, all three input modes being enabled simultaneously, a hierarchy of modes being established to resolve conflicting commands received within a predetermined period in different modes, wherein responsive to a determination that a first viewer command from a first recognized viewer conflicts with a second viewer command from a second recognized viewer, the TV executes the latest of the first and second viewer commands.

14. A television (TV) presenting a user interface allowing viewer commands to be input using a remote control (RC), voice input, and gestures in free space, all three input modes being enabled simultaneously, a hierarchy of modes being established to resolve conflicting commands received within a predetermined period in different modes, wherein responsive to a determination that a viewer command from a recognized viewer conflicts with a viewer command from a non-recognized viewer, the TV executes the viewer command from the recognized viewer.

15. A method, comprising:
presenting a user interface on an audio video display device (AVDD) having a display;
allowing viewer commands to be input using a remote control (RC), voice input, and gesture(s) in free space, wherein all three input modes are enabled simultaneously;
controlling the display responsive to user commands received from the RC, voice input, and gesture(s) in fee space; and
resolving conflicting commands received within a predetermined period, wherein responsive to a determination that a first viewer command from a first recognized viewer conflicts with a second viewer command from a second recognized viewer, the latest of the first and second viewer commands is executed to control the display.

16. The method of claim 15, further comprising establishing a hierarchy of modes to resolve conflicting commands received within a predetermined period in different modes.

17. A method, comprising:
presenting a user interface on an audio video display device (AVDD) having a display;
allowing viewer commands to be input using a remote control (RC), voice input, and gesture(s) in free space, wherein all three input modes are enabled simultaneously;
controlling the display responsive to user commands received from the RC, voice input, and gesture(s) in free space; and
resolving conflicting commands, wherein responsive to a determination that a viewer command from a recognized viewer conflicts with a viewer command from a non-recognized viewer, the viewer command from the recognized viewer is executed and not the command from the non-recognized viewer.

* * * * *